United States Patent
Haugh

(10) Patent No.: US 7,421,623 B2
(45) Date of Patent: Sep. 2, 2008

(54) SYSTEMS, METHODS, AND MEDIA FOR CONTROLLING TEMPERATURE IN A COMPUTER SYSTEM

(75) Inventor: Julianne Frances Haugh, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 615 days.

(21) Appl. No.: 10/887,440

(22) Filed: Jul. 8, 2004

(65) Prior Publication Data
US 2006/0010353 A1 Jan. 12, 2006

(51) Int. Cl.
*G06F 11/00* (2006.01)
(52) U.S. Cl. .............................. 714/47; 714/1; 702/130; 718/100; 718/104; 718/105
(58) Field of Classification Search .................... 714/47
See application file for complete search history.

(56) References Cited

U.S. PATENT DOCUMENTS

| | | | |
|---|---|---|---|
| 5,623,594 A * | 4/1997 | Swamy | 714/1 |
| 6,105,146 A * | 8/2000 | Tavallaei et al. | 714/2 |
| 6,425,092 B1 * | 7/2002 | Evans et al. | 714/13 |
| 2003/0084088 A1 * | 5/2003 | Shaffer | 709/104 |
| 2003/0191889 A1 * | 10/2003 | Forrer, Jr. | 711/112 |
| 2003/0212474 A1 * | 11/2003 | Pippin | 700/300 |
| 2005/0050373 A1 * | 3/2005 | Orenstien et al. | 713/320 |
| 2005/0172164 A1 * | 8/2005 | Fox et al. | 714/13 |
| 2007/0074071 A1 * | 3/2007 | Rothman et al. | 714/10 |

* cited by examiner

*Primary Examiner*—Yolanda L Wilson
(74) *Attorney, Agent, or Firm*—Diana Roberts Gerhardt; Schubert Osterrieder Nickelson PLLC

(57) ABSTRACT

Systems, methods and media for controlling temperature of a system are disclosed. More particularly, hardware, software and/or firmware for controlling the temperature of a computer system are disclosed. Embodiments may include receiving component temperatures for a group of components and selecting a component to perform an activity based at least partially on the component temperatures. In one embodiment, the lowest temperature component may be selected to perform the activity. Other embodiments may provide for determining an average temperature of the components, and if the average temperature exceeds a threshold, delaying or reducing the performance of the components. In some embodiments, components may include computer processors, memory modules, hard drives, etc.

8 Claims, 6 Drawing Sheets

SYSTEMS, METHODS, AND MEDIA FOR CONTROLLING TEMPERATURE IN A COMPUTER SYSTEM

FIELD OF INVENTION

The present invention is in the field of computer systems. More particularly, the present invention relates to systems, methods and media for controlling temperature levels in a computer system.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300, ThinkCentre, ThinkPad, Aptiva, and IntelliStation series of computer systems.

The performance of personal computer systems, including processing speed and storage capacity, has dramatically increased over time. Increased demands placed on personal computer systems, such as larger software suites and data storage, result in a need for even more performance. Market forces often dictate, however, that this increased performance be achieved using smaller and smaller packages.

Personal computers systems have achieved very high levels of computing power and performance despite their relatively small size. This high level of compact performance is accomplished partially through the use of high density integrated circuit packages. These high density integrated circuit packages use a significant amount of electricity, which generates high levels of localized heat within the personal computer system housing. The heating problem is exacerbated as more and more components are placed on a single chip, each component possibly contributing to the heating problem. Power densities, as measured by watts per square foot of board space (or watts per cubic foot of cabinet space), continue to increase as processors and associated components consume greater and greater amounts of power. The more wattage consumed by a given component, the greater the heat output by that component and the higher the temperature given a constant amount of cooling. As component temperatures rise, the risk of thermal failure (such as due to excessive thermal expansion) rises as well.

To combat the heating problem, computer systems attempt to dissipate the heat away from key or vulnerable components. One common way of dissipating heat is to flush it out through the use of fans and heat sinks. Heat sinks, which are typically made of a metallic material, pull generated heat away from a component. Fans blow air over the heat sinks so that heat is extracted from the heat sink to the air, and the air (with extracted heat) is then directed outside of the computer system. The fan and heat sink system does not always provide a sufficient amount of cooling, particularly when fans and heat sinks are designed with space, cost, and noise restrictions.

Heating problems are often exacerbated with servers. Many organizations have consolidated servers into centralized data centers, seeking to use physical, application or data consolidation as a means of reducing the challenges and costs associated with administering many small servers scattered across the enterprise. By placing multiple heat generating sources in close proximity, thermal loads can be even more of a problem as servers transfer heat to nearby servers, and airflows become more complicated and restricted when multiple servers are closely located.

Liquid cooling may also be used to cool a computer system. A liquid cooling system uses a liquid coolant to extract heat from components, but such systems are typically very expensive as they require pumps, heat exchangers, etc. Liquid cooling is therefore usually reserved for very expensive or very demanding computer systems, such as supercomputers.

There is, therefore, a need for an effective and efficient system to facilitate cooling of computer systems, to control the temperature of components, and to avert overheating conditions.

SUMMARY OF THE INVENTION

The problems identified above are in large part addressed by systems, methods and media for controlling temperature of a computer system. One embodiment provides a method for controlling temperature of a system. The method generally includes receiving a request for an activity to be performed and receiving component temperatures of two or more available components. The method also generally includes selecting a component from the available components based at least partially on the component temperatures of the available components, as well as directing the selected component to perform the requested activity. The components may be computer processors, memory modules, hard drives, or any other item.

Another embodiment provides a machine-accessible medium containing instructions effective, when executing in a data processing system, to cause the system to perform a series of operations for synchronizing a database on a network. The series of operations generally includes receiving a request for an activity to be performed and receiving component temperatures of two or more available components. The series of operations also generally includes selecting a component from the available components based at least partially on the component temperatures of the available components, as well as directing the selected component to perform the requested activity.

A further embodiment provides a data processing system for controlling the temperature of a computer system. The data processing system may include a sensor controller for receiving component temperatures from temperature sensors. The data processing system may further include a temperature determiner for determining the relative temperatures of the components and a component controller for selecting a component to perform an activity based on the relative temperatures of the components. In one embodiment, the temperature determiner determines the lowest temperature component, and the lowest temperature component is selected to perform the activity.

One embodiment provides a method for controlling temperature of a system. The method generally includes receiving a request for an activity to be performed and receiving component temperatures of two or more available components. The method also generally includes calculating an average component temperature for the available components and determining if the average temperature is above a threshold. In the event the average temperature is above the threshold, the method includes modifying the use of components to perform the requested activity. Further embodiments provide that modifying the use of components to perform the requested activity includes delaying the use of a component for a period of time or reducing the level of performance of a component.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods and media for controlling temperature of a system are disclosed. More particularly, hardware, software and/or firmware components for controlling temperature of a computer system are disclosed. Embodiments include systems, methods and media for receiving component temperatures of two or more components from one or more temperature sensors. From these component temperatures, a decision about which component to use to perform an activity may be made in one embodiment. In one embodiment, the component with the lowest temperature may be selected to perform the activity. By selecting the component with the lowest temperature (or by making that component more likely to be selected), the temperature of the lowest temperature component will likely increase and the temperature of higher temperature components will likely decrease, which will have an average effect on the group of components. The averaging effect advantageously helps to minimize the maximum temperature of any component, which helps reduce overheating problems.

In another embodiment, the average temperature of the components may also be determined. In this embodiment, if the average temperature exceeds a threshold, performance of the activity may be delayed or the performance of the component may be reduced. This advantageously helps prevent a group of components from overheating and potentially being damaged.

While specific embodiments will be described below with reference to particular configurations of hardware, software and/or firmware, those of skill in the art will realize that embodiments of the present invention may advantageously be implemented with other substantially equivalent hardware and/or software systems.

Figure 1:
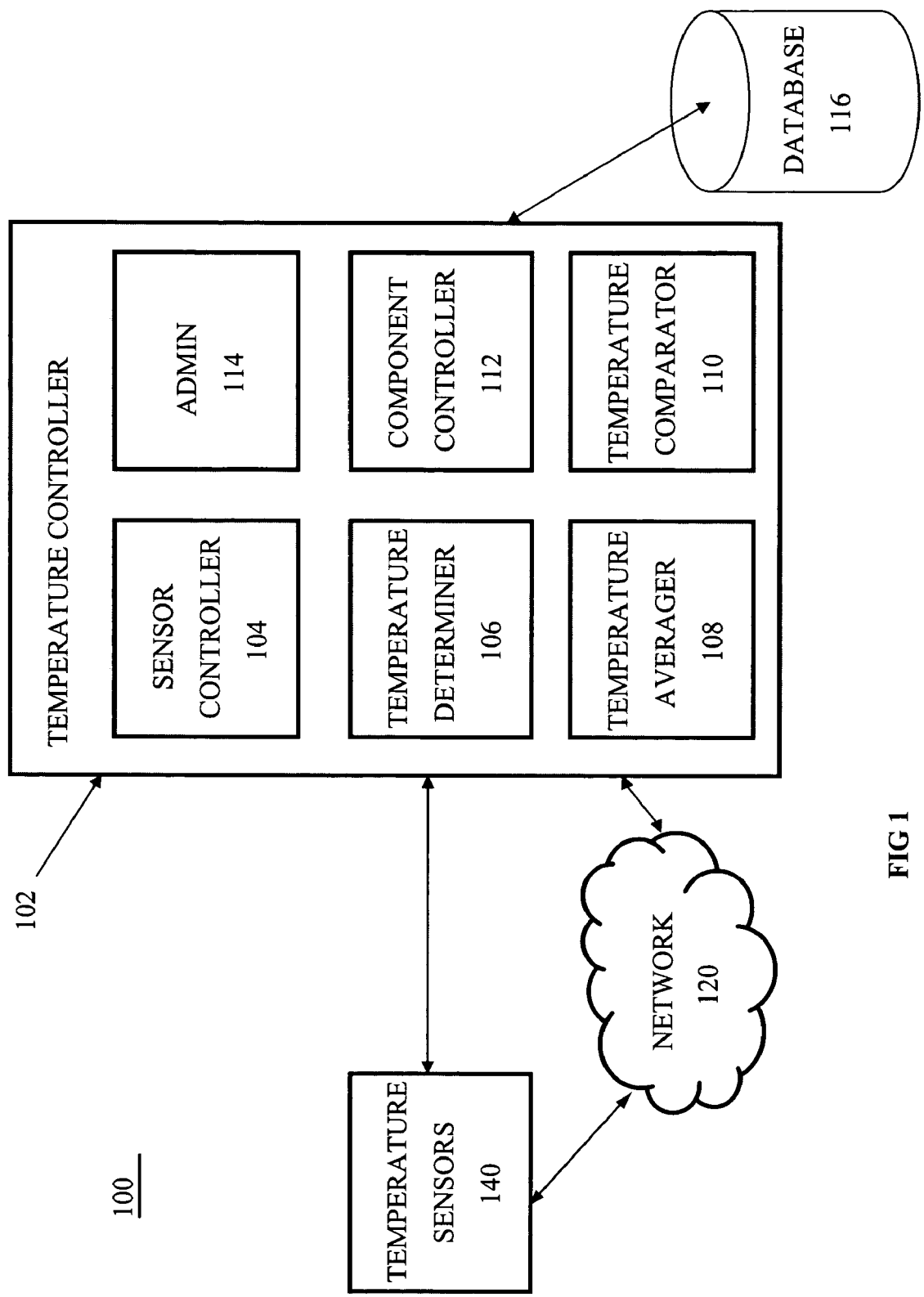
FIG. 1 depicts an environment for a system for controlling temperature of a computer system according to one embodiment.

Turning now to the drawings, FIG. 1 an environment for a system 100 for controlling temperature of a computer system according to one embodiment. In the depicted embodiment, system 100 includes a temperature controller 102 in communication with one or more temperature sensors 140. The temperature controller 102 and the temperature sensors 140 may be in communication via a network 120 or any other means, such as when they are part of the same computer system, wirelessly, etc. System 100 may also include a database 116 in communication with the temperature controller 102.

Figure 2:
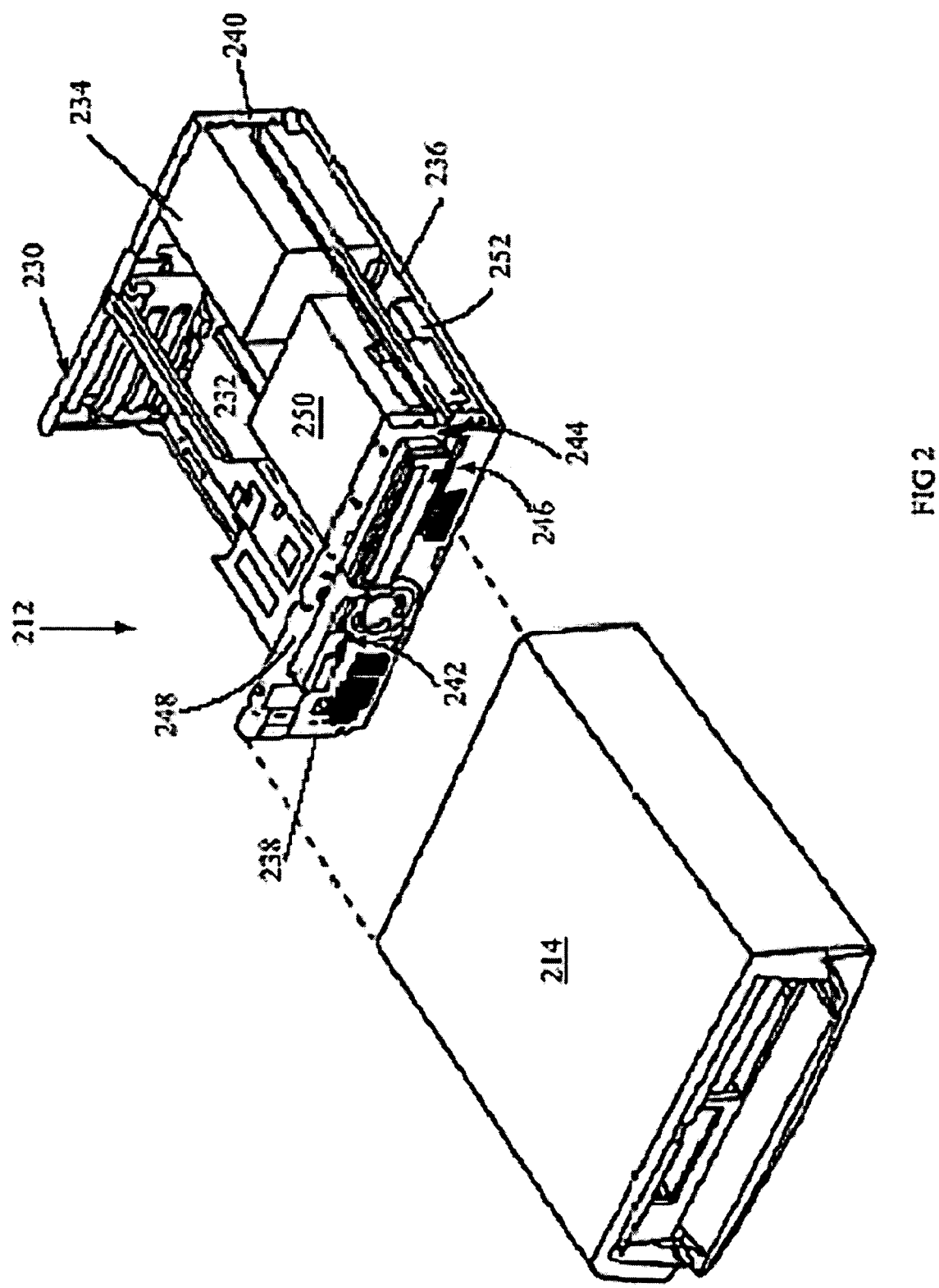
FIG. 2 depicts an exploded perspective view of certain elements of a processing device such as a personal computer, including a chassis, a cover, and a planar board.
Figure 3:
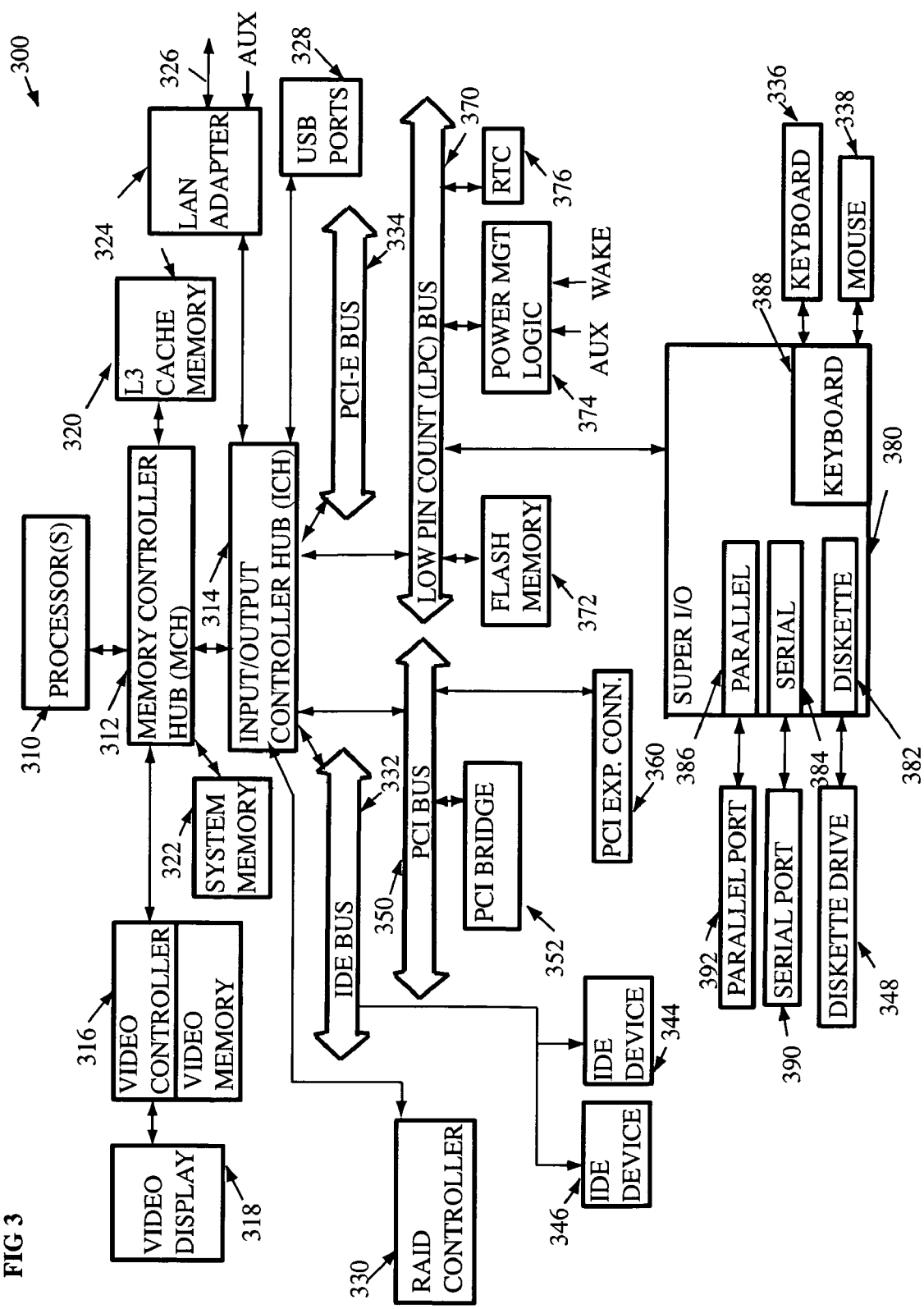
FIG. 3 depicts a block diagram of certain components of the processing device of FIG. 2.

In one embodiment, system 100 is implemented on a computer system, such as a personal computer as described in relation to FIGS. 2-3. In this embodiment, the temperature sensors 140 may be components of the computer system, the database 116 may be, for example, the hard drive of the computer system, and the temperature controller 102 may be hardware, software, and/or firmware within the computer system.

In an alternative embodiment, system 100 is implemented via network 120. Optional network 102 may be any type of data communications channel, such as the Internet, an intranet, a LAN, a WAN, an Ethernet network, wireless networks, etc. In this embodiment, the temperature sensors 140 may be located at one or more systems, such as computer systems, and be in communication with network 120. The temperature controller 102 may then be located anywhere such that it is in communication with network 120 and, thus, the temperature sensors 140. In this embodiment, one temperature controller 102 may control any number of systems with temperature sensors 140. For example, a server farm may have one temperature controller 102 (that may be executing on one server) controlling the temperature of components of the remaining servers, each with its own temperature sensors 140.

Temperature sensors 140 may be any type of sensor that provides an indication of a temperature. Temperature sensors 140 may be mounted on a component, located near a component, integrated with a component, etc. Typical components for which temperature sensors 140 might be used include processors, memory modules, hard drives, video cards or controllers, etc. The temperature sensors 140 may be located on different components in one computer system, in different computer systems, etc. Many components or boards which contain those components include some form of temperature sensor 140. As an example, the Tyan Tiger MPX motherboard includes thermal sensors 140 for two central processors, the DDR memory, the AGP video controller, etc. Alternatively, temperature sensors 140 may be added to the components, on the board, within the computer system, etc.

Temperature controller 102 may include a sensor controller 104, a temperature determiner 106, a temperature average 108, a temperature comparator 110, a component controller 112, and an administration module 114. Temperature controller 102 may include specific purpose processors, a general purpose machine configured by software to execute aspects of the invention, or combinations of the two. The temperature controller 102 may be a part of a computer system or an independent machine remote from the computer system, coupled via a cable, a network, a wireless network, or the like.

Sensor controller 104 may provide communication or coupling with temperature sensors 140. As described above, the temperature sensors 140 may be located on different components in one computer system, in different computer systems, etc. Sensor controller 104 may be adapted to receive an indication of a temperature reading from a temperature sensor 140. Sensor controller 104 may also be adapted to transmit a request for a temperature reading or other command (e.g., turn on or off, status request, etc.) to the temperature sensors 140.

Temperature determiner 106 may receive the indication of temperature from the sensor controller 104 and perform processing on the indications of temperature. Any type of processing may be performed, such as converting temperature units, determining a component temperature based on the indication of temperature, etc. Temperature averager 108 may receive component temperatures from the temperature determiner 106 and calculate an average temperature. In one embodiment, temperature average 108 creates an average of a certain type of component (e.g., an average of processor temperatures), but it may also create an average of all components or any subset of components, an average across a computer system, an average across similar components in different computer systems, etc.

Temperature comparator 110 may identify a temperature of the temperatures received or determined (e.g., an average temperature) that exceeds a threshold temperature. Temperature comparator 110 may be in communication with the temperature determiner 106, the temperature averager 108, or the sensor controller 104. The threshold temperatures may be maintained locally, in database 116, etc. Threshold temperatures may be defined temperatures at which components or computer systems may have problems if the defined temperatures are exceeded. Threshold temperatures may be defined by user or administrator selection, be based on manufacturer ratings, etc.

Component controller 112 may be used to send commands to various components or to other controllers that control those components. Commands may include requests to perform activities (e.g., processing, storage of data, etc.), requests to turn on or off, requests to operate at a particular level of performance (e.g., requesting a processor to perform at half-speed), etc. In one embodiment, component controller 112 may transmit commands directly to a particular component, such as via network 120 or any other means. In another embodiment, component controller 112 transmits commands to a local controller, such as a memory or processor controller, so that those controllers may actually interface with the components.

Administrator module 114 may be used to configure other modules of the temperature controller 102, including interface with database 116. In one example, threshold temperatures for the temperature comparator 110 may be set using administrator module 114. In another example, various aspects of the component controller 112 may be configured, such as preventing certain actions from taking place (e.g., do not reduce the speed of the hard drive) or giving priority to certain actions (e.g., reduce the speed before turning component off). Database 116 may be located anywhere within system 100, including as a standalone database or as part of the temperature controller 102. Database 116 may be used for storage of any information, including threshold temperatures, defined preferences, temperature histories, etc.

FIGS. 2 and 3 depict one embodiment of a personal computer 212 suitable for use with system 100. Other possibilities for a computer system for use with system 100 are possible, including a computer having capabilities greater or lesser capabilities than those ascribed herein to a "personal computer". In other embodiments, the computer system may be any combination of processing devices such as workstations, servers, notebook or laptop computers, desktop computers, personal digital assistants (PDAs), or the like.

FIG. 2 depicts an exploded perspective view of certain elements of a personal computer 212 according to one embodiment, including a chassis 230, a cover 214, and a planar board 232. Cover 214 is a decorative outer member that cooperates with a chassis 230 in defining an enclosed, shielded interior volume for receiving electrically powered data processing and storage components to process and store digital data. At least certain of these components may be mounted on a multi-layer planar 232 or motherboard which may be mounted on the chassis 230 and may provide a means for electrically interconnecting the components of the personal computer 212, including those identified above and such other associated elements as floppy disk drives, various forms of direct access storage devices, accessory adapter cards or boards, and the like.

Personal computer 212 may have a power supply 234 that may be actuated by a power switch (not shown). The chassis 230 may have a base indicated at 236, a front panel indicated at 238, and a rear panel indicated at 240. The front panel 238 may define at least one open bay for receiving a data storage device such as a disk drive for magnetic or optical disks, a tape backup drive, or the like.

In the illustrated form, a pair of upper bays 242, 244 and a lower bay 246 are provided. One of the upper bays 242 may be adapted to receive peripheral drives of a first size (such as those known as 3.5 inch drives) while the other 244 may be adapted to receive drives of a different size (such as a CD-ROM or DVD-ROM drive) while the lower bay may be adapted to receive another drive. One floppy disk drive indicated at 248 may be a removable medium direct access storage device (DASD) capable of receiving a diskette inserted there into and using the diskette to receive, store and deliver data as is generally known. One CD-ROM drive indicated at 250 is a removable medium DASD capable of receiving a compact disk inserted there into and using the disk to deliver data as is generally known. One hard disk drive is indicated at 252 and is a fixed medium DASD capable of storing and delivering data as is generally known.

Referring now to FIG. 3, there is shown a block diagram 300 of certain components of the personal computer 212 of FIG. 2. The components of FIG. 3 comprise components mounted on the planar 232 or other hardware of the personal computer 212. Connected to the planar 232 is the system CPUs or processor(s) 310, which may be connected directly to a memory controller hub (MCH) 312. As one example, the system processor(s) 310 could be an Intel Pentium processor, Cyrix 586-P75 processor or Advanced Micro Devices 8486 processor or any other suitable processor.

MCH 312 and input-output (I/O) controller hub (ICH) 314 represent part of the personal computer's 212 core logic chipset, facilitating access to/from processor(s) 310 from/to memory devices and I/O devices, respectively. More specifically, MCH 312 may provide access to system memory 322 and level three (L3) cache memory 320. In many such embodiments, level one (L1) and level two (L2) cache are incorporated into each processor of processor(s) 310.

MCH 312 may also include a special bus adapted for direct memory access (DMA) by a video controller. In some embodiments, the special bus may be an accelerated graphics port (AGP). The AGP may be a high-speed port that is designed for the display adapter 316, a video card typically including a video controller and video memory. The AGP may provide a direct connection between the card 316 and system memory 322. AGP may use, e.g., a 32-bit bus to provide data transfer rates such as 264 Megabytes per second, 528 Megabytes per second, one Gigabyte per second, and two Gigabytes per second. In other embodiments, a peripheral component interconnect (PCI) bus such as a PCI-E bus may be implemented for video display 318.

System memory 322 may include random access memory (RAM) such as double data rate (DDR) synchronous dynamic random access memory (SDRAM). System memory 322 may be composed of one or more memory modules and MCH 312 may include a memory controller with logic for mapping addresses to and from processor(s) 310 to particular areas of system memory 322 and a cache controller operatively coupled with L3 cache memory 320.

Input/Output Controller Hub (ICH) 314 may be designed to coordinate communications with various I/O devices. In the depicted embodiment, ICH 314 couples with local area network (LAN) adapter 324, universal serial bus (USB) ports 328, redundant array of independent disks (RAID) controller 330, integrated drive electronics (IDE) bus 332, PCI Express (PCI-E) bus 334, PCI bus 350, and low pin count (LPC) bus 370. LAN adapter 324 may be coupled to either the PCI bus 350 or directly to ICH 314 to facilitate communication (i.e., transmit/receive data) with a remote computer or server over a LAN via a connection or link 326. LAN adapter 324 may be a card to be plugged in personal computer 212 or a LAN connection embedded on the planar 232. LAN adapter 324 may also be known as a network interface card (NIC).

LAN adapter 324 may include a Media Access Controller (MAC), which serves as an interface between a shared data path (e.g., a media independent interface as described below) and the ICH 314. The MAC may perform a number of functions involved in the transmission and reception of data packets. For example, during the transmission of data, the MAC assembles the data to be transmitted into a packet with address and error detection fields. Conversely, during the reception of a packet, the MAC disassembles the packet and performs address checking and error detection. In addition, the MAC typically performs encoding/decoding of digital signals transmitted over the shared path and performs preamble generation/removal as well as bit transmission/reception. The MAC may be, for example, an Intel 82557 chip.

LAN adapter 324 may further comprise a physical layer and a media independent interface (MII), which is a local bus between the MAC and the physical layer. The MII is a specification of signals and protocols, which formalizes the interfacing of a 10/100/1000 Mbps Ethernet MAC, for example, to the underlying physical layer. The physical layer receives parallel data from the MII local bus and converts it to serial data for transmission over link 326. The physical layer may be, for example, an Integrated Circuits Systems 1890 chip. The physical layer includes auto-negotiation logic that, in one embodiment, determines the capabilities of a server, advertises its own capabilities to the server, and establishes a connection with the server using the highest performance common connection technology. In the depicted embodiment, personal computer 212 also includes wake-on-LAN functionality incorporated into LAN adapter 324.

Personal computer 212 may include one or more USB ports 328, which are hardware interfaces for peripherals such as the keyboard, mouse, joystick, scanner, printer, telephony devices, hard drives, compact disk (CD) drives, digital video disk (DVD) drives, and the like. USB ports 328 also typically support MPEG-1 and MPEG-2 digital video. A USB 1.1 protocol for USB ports 328 has a maximum bandwidth of 12 Megabits per second (equivalent to 1.5 Megabytes per second), and up to 127 devices can be attached. Fast devices can use the full bandwidth, while lower-speed ones can transfer data using a 1.5 Megabits per second subchannel. A USB 2.0 protocol, widely known as Hi-Speed USB, increases capacity to 480 Megabits per second. Further, USB ports 328 support hot swapping, which allows peripherals to be plugged in and unplugged without turning the system off.

Personal computer 212 may include a RAID controller 330, which is a controller for a disk subsystem that is used to increase performance or provide fault tolerance. More specifically, RAID controller 330 couples with a set of two or more ordinary hard disks and improves performance by disk striping, which interleaves bytes or groups of bytes across multiple drives, so more than one disk is reading and writing simultaneously. RAID controller 330 adds fault tolerance by mirroring or parity. Mirroring is 100% duplication of the data on two drives (RAID 1), and parity is used (RAID 3 and 5) to calculate the data in two drives and store the results on a third: a bit from drive 1 is XOR'd with a bit from drive 2, and the result bit is stored on drive 3. A failed drive can be hot swapped with a new one, and the RAID controller automatically rebuilds the lost data from backups maintained on other drives. In addition, RAID systems may be built using a spare drive (hot spare) ready and waiting to be the replacement for a drive that fails.

IDE bus 332 and PCI-E bus 334 may be incorporated to facilitate connection of additional I/O devices with ICH 314. IDE bus 332 is a type of hardware interface widely used to connect hard disks, CD-ROMs and tape drives to a PC. IDE bus 332 provides for the attachment for hard disk drive 344 and CD-ROM drive 346. PCI-E bus 334 is a high-speed peripheral interconnect. PCI-E bus is designed to match the higher speeds of CPUs and can accommodate Gigabit and 10 Gigabit Ethernet and even support chip-to-chip transfers. Rather than the shared, parallel bus structure of PCI, PCI-E bus 334 provides a high-speed, switched architecture. Each PCI Express link is a serial communications channel made up of two differential wire pairs that provide 2.5 Gigabits per second in each direction. Up to 32 of these "lanes" may be combined in x2, x4, x8, x16 and x32 configurations, creating a parallel interface of independently controlled serial links. The bandwidth of the switch backplane determines the total capacity of PCI-E bus 334.

PCI bus 350 may couple a PCI bridge 352 to facilitate the connection of additional PCI devices and a PCI expansion connector 360 to facilitate expansion of the PCI bus 350 so even more peripheral devices can communicate with ICH 314 via PCI bus compatible peripheral cards.

Attached to the LPC 370 may be a flash memory (FM) module or chip 372, power management logic 374, and a real-time clock (RTC) 376, and a multi-function or super I/O controller 380. Flash memory module 372 contains microcode that personal computer 212 will execute on power on. The flash memory 372 may be a non-volatile memory module or chip.

Power management logic 374 allows for changing between various power states (e.g., off, suspend and normal operating states). The circuitry is supplied with auxiliary power (AUX), or standby power, from the power supply 234 (as shown in FIG. 2) when the personal computer 212 is in the off state so that it can monitor events that cause the personal computer 212 to turn on. For example, the circuitry may also include a timer that is configurable by a user to expire after a predetermined period of time, often referred to as a time to power on function. When the timer expires, the circuitry such as a service processor may cause the personal computer 212 to change from the off state to the normal operating state.

The real-time clock (RTC) 376 may be used for time of day calculations. Super I/O controller 380 may include functionality such as, for example, a National Semiconductor PC87307. The super I/O controller 380 may contain a variety of I/O adapters and other components such as the diskette adapter 382, serial adapter 384, a parallel adapter 386 and keyboard controller 388. The diskette adapter 382 provides the interface to the diskette drive 348. The serial adapter 384 has an external port connector, serial port 390, for attachment of external devices such as modems (not shown). The parallel adapter 386 has an external port connector, parallel port 392, for attachment of external devices such as printers (not shown). The keyboard controller 388 is the interface for the connectors, keyboard 336 and mouse 338.

Temperature sensors 140 may be located anywhere within personal computer 212, including anywhere within the housing 214 or on or near any components. Possible components for a temperature sensor 140 include system memory 332, system processors 310, MCH 312, etc. Temperature sensors may, however, be located so as to determine the temperature of any component of personal computer 212.

Figure 4:
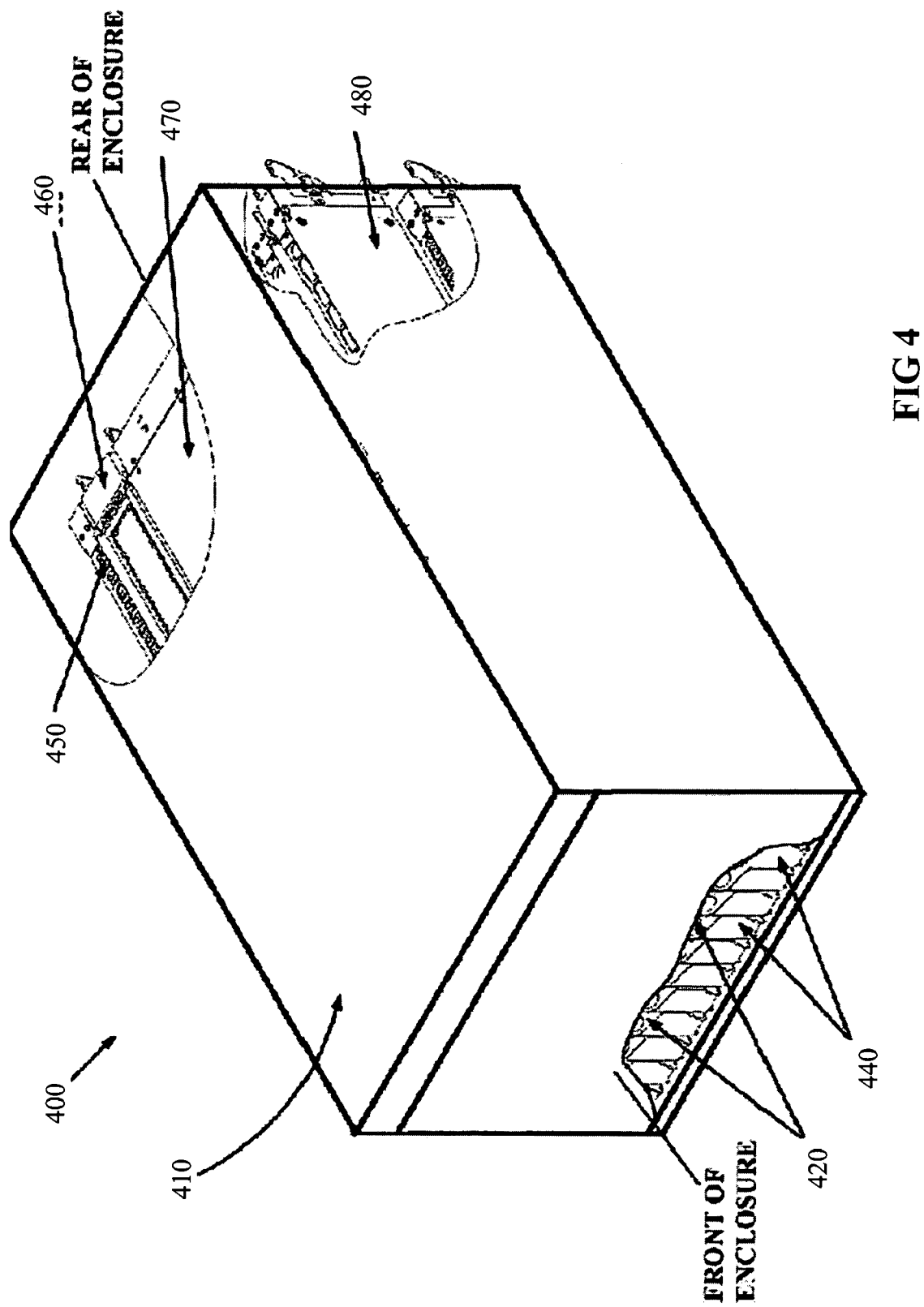
FIG. 4 depicts an exploded perspective view of a blade server type system having servers with vents and a blower in an enclosure to mount in a server rack.

FIG. 4 depicts an exploded perspective view of a blade server type system having servers with vents and a blower in an enclosure to mount in a server rack. System 400 may be a blade server that supports a high spatial density of servers 420. In the depicted embodiment, system 400 includes an enclosure 410, servers 420, vents 440, a management controller module 450, a power module 460, a blower 470, and a switch module 480. Enclosure 410 may house multiple servers 420 sharing common management controllers, power modules, switch modules, and blowers to reduce the number of potential component failures and the physical distribution of support equipment. In many embodiments, connectors for servers 420 may couple servers 420 with the support modules to reduce wiring requirements and to facilitate installation and removal of servers 420. For instance, each of servers 420 may couple with a gigabit Ethernet network via switch module 180. Advantageously, enclosure 410 may couple servers 420 to an Ethernet network without connecting cables directly to each server.

System 400 may be utilized with temperature controller 102 similarly to system 100. In one embodiment, temperature sensors 140 may be located with various components of multiple servers 420. Temperature controller 102 may be located on one of the servers 420, within enclosure 410, as part of the management controller module 450, remotely and in communication via a network, etc.

Enclosure 410 may also provide for hot-swappable units, allowing, in one example, a server to be installed in an empty server slot while other servers 420 continue to function. Temperature sensors 140 (not shown in FIG. 4) coupled with management controller 450 may monitor temperatures throughout enclosure 410. In other embodiments, each element may include temperature sensors coupled with management controller 450 via enclosure 410 to monitor temperatures throughout the enclosure 410. In several embodiments, enclosure 410 also includes one or more disk drives, hard drives, compact disk (CD) drives, and/or digital versatile disk (DVD) drives to couple with the servers 420. The drives may facilitate installation of operating systems and other applications on the servers 420.

Servers 420 may include single or multi-processor servers having hard drives and memory to service one or more common or independent networks. In the depicted embodiment, servers 420 include vents 440 to facilitate forced air intake and exhaust to remove heat produced by components of the server, such as processors. In particular, blower 470 may draw air from the front of enclosure 410, through or around servers 420, and exhaust the air through the rear of the enclosure 410.

Management controller 450 may include thermal analysis software, firmware and/or state machines to analyze temperatures detected throughout enclosure 410. In one embodiment, management controller 450 may serve as the temperature controller 102 of FIG. 1.

Figure 5:
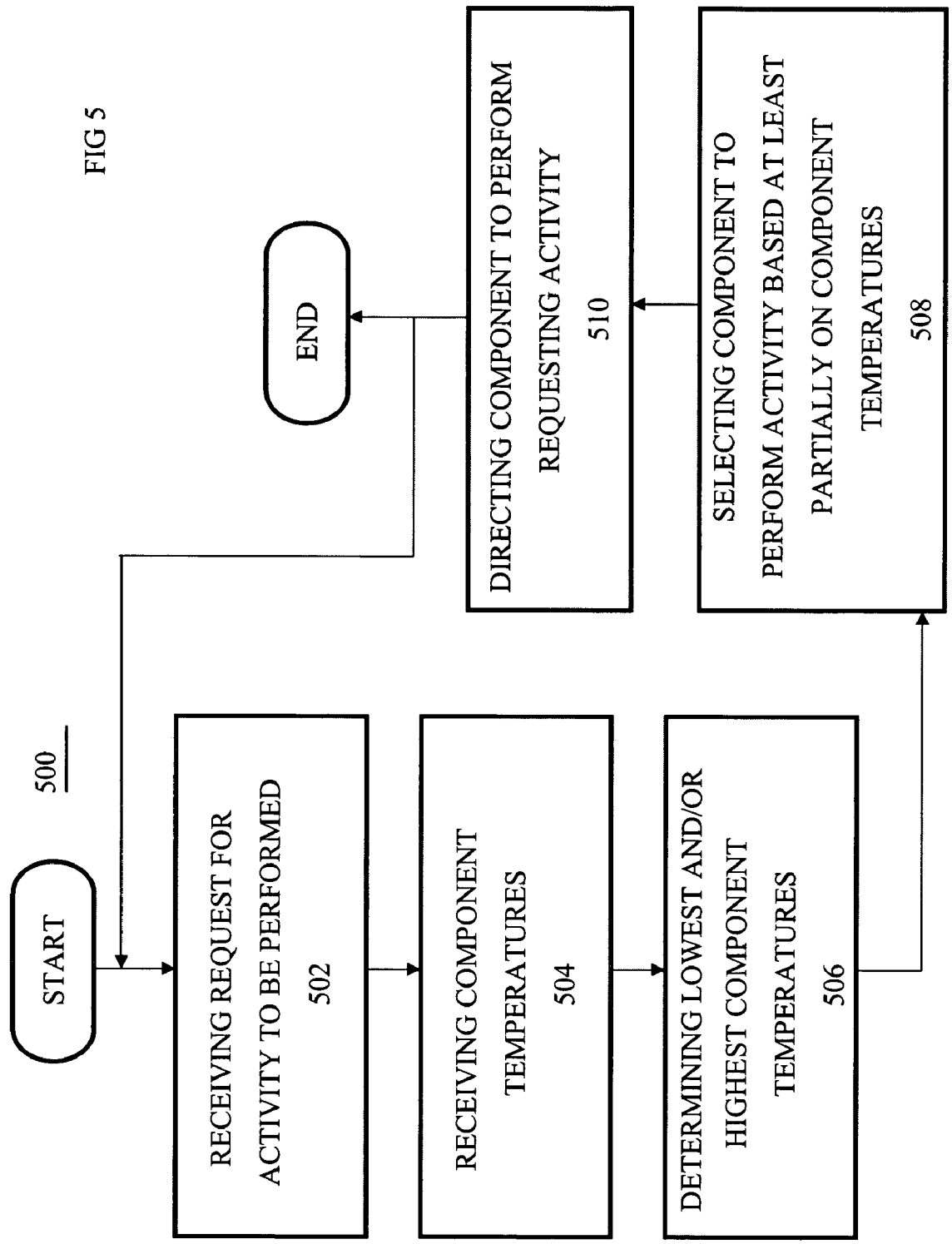
FIG. 5 depicts an example of a flow chart for receiving component temperatures and selecting a component to perform an activity based at least partially on the component temperatures according to one embodiment.

FIG. 5 depicts an example of a flow chart 500 for receiving component temperatures and selecting a component to perform an activity based at least partially on the component temperatures according to one embodiment. The method of flow chart 500 may be performed, in one embodiment, by the temperature controller 102. Flow chart 500 begins with optional element 502, receiving a request for an activity to be performed. Activities may include any action that may be performed by any components, such as processing, storage of data, etc. The request may be received from any source and may be received by the temperature controller 102, the computer system, etc. Element 502 need not be performed if the function of flow chart 500 is related to an ongoing activity, such as continued processing, instead of responding to a specific request for an activity.

Flow chart 500 continues with element 504, receiving component temperatures. In one embodiment, component temperatures are received from one or more temperature sensors 140. Temperatures sensors 140 may be located on different components within the same or multiple computer systems. In one embodiment, an indication of component temperature is received instead of a value for the component temperature. In this embodiment, the value of the component temperature is then determined based on the indication of the component temperature, such as by a temperature determiner 106. In another embodiment, temperatures of available components are received. Available components are components to be considered for performing the activity. Any methodology may be used to determine which components are available components, such as components that are capable of performing the activity, that are currently idle, components for which the temperature controller 102 has the appropriate permissions, etc.

Flow chart 500 continues to element 506, determining the lowest and/or highest component temperatures. Element 506 may be performed by the temperature comparator 110 of the temperature controller 102. Flow chart 500 then continues to element 508, selecting component to perform an activity based at least partially on the component temperatures determined in element 506. The benefits of element 508 rely on the premise that there is some positive correlation between the amount of activities being performed and the heat generated at that component. Most functions performed by modern computer components, such as processing or data storage, generate heat as a byproduct of their consumption of electricity. Accordingly, reducing the amount of processing or other activity performed by a component generally reduces the amount of heat generated by the component. If the amount of heat generated by a component is decreased, the temperature of the component will likely also decrease, absent environmental factors (such as the temperature around the component increasing from other sources).

In one embodiment, element 508 will select the lowest temperature component to perform an activity. This, in many cases, will provide an effective thermal management system as the lowest temperature component is often the component most likely able to handle the new activity (and the associated heat generated). For example, if a four-processor computer system had processor temperatures of 100 degrees, 125 degrees, 130 degrees, and 150 degrees, a new processing request would be directed to the first processor (e.g., routing system interrupts to the first processor) in this embodiment. After a number of processing requests are performed, the temperature of the first processor may increase until another processor may have the lowest temperature, after which it will be the recipient of the next request.

In another embodiment, components other than the highest temperature component are selected. As activities are directed away from the high temperature components and towards lower temperature components, the higher temperature component will have a tendency to cool down (and the lower temperature component may heat up). This brings all components closer to an average temperature and reduces the maximum temperature of any component. Using the processor example above, element 508 could prevent new processing requests from going to the fourth processor (at 150 degrees) until its temperature dropped enough so that it would not be the highest temperature processor. The processing requests could be directed to the lowest temperature processor, multiple processors, etc.

In another alternative embodiment, component temperature is only one factor to consider with a plurality of factors in determining which component will perform an activity. In one example, temperature sensors 140 may be located on each of a bank of memory modules. Traditionally, the appropriate memory module for a new item to be stored is determined based on a number of factors, including available space, amount of contiguous memory locations, current queue, etc. In this embodiment, the temperature of the memory module may also be considered so that temperature becomes another factor in determining the appropriate module. If, say, a memory module was very hot, element 508 in this embodiment would be less likely to select that module to save a new item, possibly resulting in an eventual reduction in the temperature of that memory module.

Flow chart 500 continues to element 510, where the function directs the component selected in element 508 to perform the requested activity, after which the flow chart terminates or returns to the beginning. The component may be directed via any means, such as by directing resources to the component, by routing instructions or system interrupts to a component, by providing instructions directly or indirectly to the component, etc.

Many types of components are suitable for use with flow chart 500. Multiple processors systems, as described above, are a natural fit. In a multiprocessor system, an interrupt controller, for example, might include logic by which it routes system interrupts to the processor having the lowest temperature. In another example, the operating system schedule logic may consider the temperature of each idle processor when selecting a processor from a group of available processors. An example of another component would be disk drives, as paging spaces located on disk drives may be selected at least partially on the temperature of the disk drives. Similarly, memory pages from a pool of free memory pages might be selected based on the temperature of the memory module containing those pages. Any type of component in a computer system is suitable for the method of flow chart 500.

Figure 6:
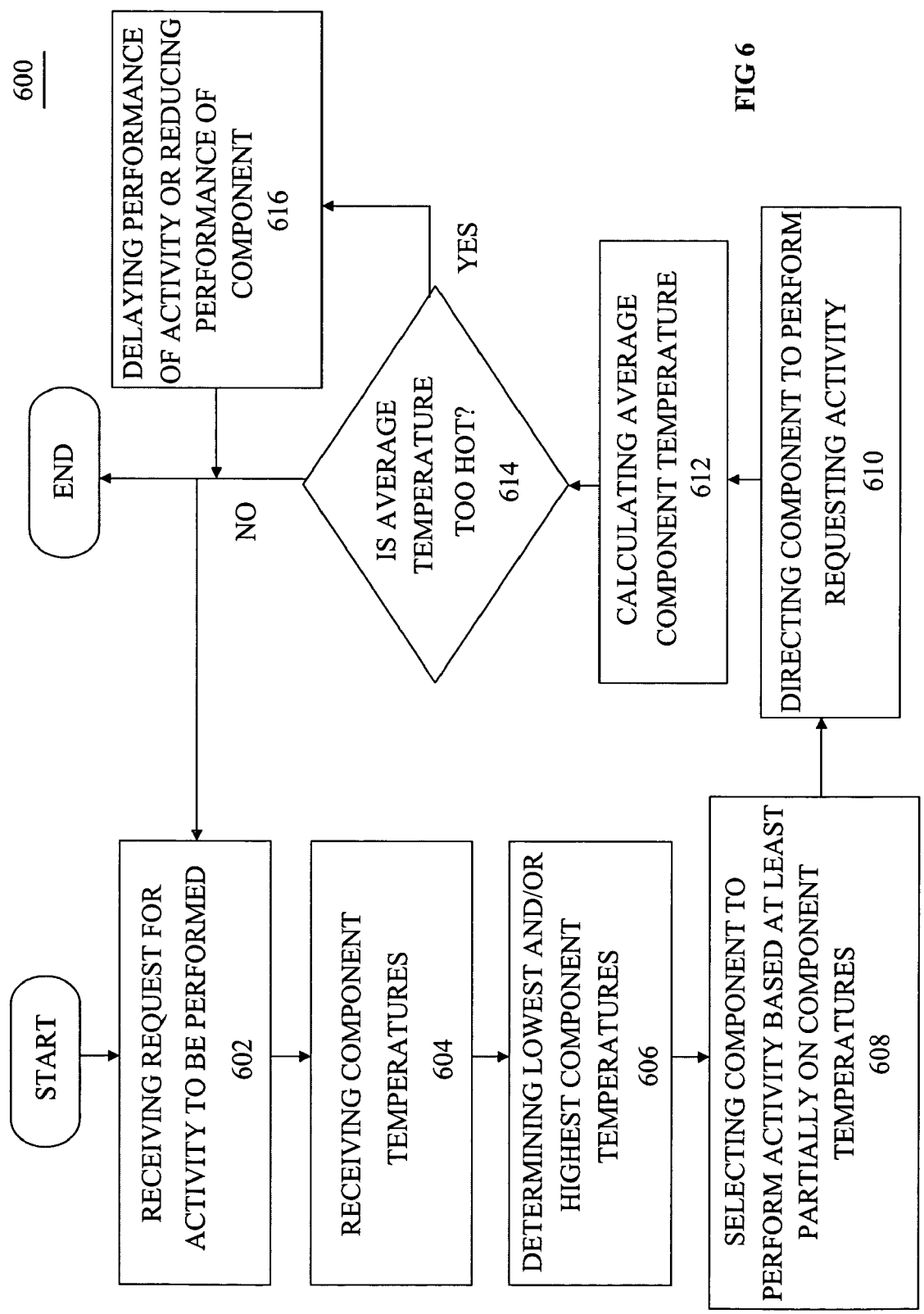
FIG. 6 depicts an example of a flow chart for receiving component temperatures and delaying performance of an activity or reducing the performance of a component based on the component temperatures according to one embodiment.

FIG. 6 depicts an example of a flow chart for receiving component temperatures and delaying performance of an activity or reducing the performance of a component based on the component temperatures according to one embodiment. The method of flow chart 600 may be performed, in one embodiment, by the temperature controller 102. Elements 602, 604, 606, 608, and 610 of flow chart 600 are equivalent to the similarly numbered functions of flow chart 500 of FIG. 5 and should be considered equivalent for all purposes. The method of flow chart 600 may be useful, for example, when the method of flow chart 500 has failed to sufficiently reduce the temperature of a system, as the method of flow chart 600 adds additional functionality to that of flow chart 500 by further reducing the chance of overheating a group of components.

Flow chart 600 continues after element 610 to element 612, calculating average component temperature. In this element, the average component temperature is calculated from the component temperatures received in element 604, such as by the temperature averager 108. Any type of average may be calculated, such an average of all temperatures, an average of similar components on one or more computer systems, etc.

After element 610, flow chart 600 continues with decision block 614, determining if the average temperature is too hot (in other words, determining if the average temperature is sufficiently hot so as to require action). The determination may, in one embodiment, be made based on a defined threshold (e.g., average temperature of the processors over 200 degrees Fahrenheit). The defined threshold may also be user-configurable. Many motherboards that contain temperature sensors also include a BIOS-configurable maximum temperature for CPUs or other components in the event that the processor or component exceeds a given temperature. A similar methodology may be used by having a user-configurable maximum average temperature for a set of components.

Decision block 614 may be performed by the temperature comparator 110 of FIG. 1. If the average temperature is not high enough to require action or meet a threshold, the flow chart terminates or returns to element 602 for continued processing. If the average temperature is high enough to require action, the flow chart continues to element 616.

In element 616, the method delays performance of an activity or reduces the performance of a component based on the average temperature of a group of components. This may eliminate or drastically reduce the possibility of a group of components from overheating. In one embodiment, element 616 delays the performance of an activity by a group of components. This may be accomplished by delaying the direction of resources to the components, by direct or indirect command, etc. After the delay, the component may be directed to perform the activity as in element 610, in one example.

Delaying the performance of an activity slows the generation of heat by the group of components (as heat generation is positively correlated with the use of resources such as components) and allows existing heat dissipation or cooling methodologies to perform their work. In one example, processing requests are delayed when the average temperature of the processors is too high. The delay might be for a set number of processing cycles, for a set period of time, until the temperature drops below a threshold temperature, etc. This helps prevent additional increases in the temperatures of the components in the group. Other examples include delaying the use of memory or hard drive space, delaying access to removable media, etc. In some embodiments, other components may provide an alternative resource or other type of component. For example, RAM may be used as temporary storage instead of an overheated bank of hard drives.

In another embodiment, element 616 reduces the performance of a component or group of components in response to an excessive average temperature. Many components may have the possibility of a reduced level of performance. One example of a reduced level of performance includes lowering the processor speed of a processor, such as performed by Intel Corporation's SpeedStep functionality, which allows the clock rate of a processor to be reduced in order to reduce the amount of power used for the purpose of conserving battery life. Reducing the clock rate of a processor, and thus its power consumption, will also have the effect of reducing the heat generated by the processor. Similarly, the spin speed of a hard drive can also be reduced, resulting in lower performance but with lower power consumption and, thus, less generation of heat.

A number of techniques exist to reduce power consumption of personal computer systems, especially mobile computers. Besides Intel Corporation's SpeedStep technology, disk spin-down delays, variable speed operation and other techniques are used to reduce power consumption. These techniques may be used in the method of flow chart 600 to control and modulate the temperature of system components as reduction of power consumption will also reduce the generation of heat. In other instances, techniques appropriate to the technology may be used, such as inserting delays between the time a disk device completes a request and the time it issues the next request in a queue of disk requests. All of these, and other, techniques may be utilized in element 616 to reduce power consumption and thus reduce component temperature.

In an alternative embodiment, the method of flow chart 600 may be streamlined to include only elements 602, 604, 612, 614, and 616. In this embodiment, the request for an activity and component temperatures are received and the average component temperature is then calculated. If the average component temperature is excessive, the performance of the activity is delayed or the components are used at a reduced level of performance. This embodiment provides a straightforward methodology for preventing an average temperature for exceeding a defined threshold.

The program(s) of the programmable product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, indicate embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for controlling the temperature in a computer system. It is understood that the form of the invention shown and described in the detailed description and the drawings are to be taken merely as examples. It is intended that the following claims be interpreted broadly to embrace all the variations of the example embodiments disclosed.

What is claimed is:

1. A method for controlling temperatures of a system, the method comprising:
   receiving a request for an activity to be performed;
   receiving component temperatures of two or more available components from one or more temperature sensors, wherein the available components are capable of performing the requested activity;
   selecting a component from the available components, wherein the selection of the selected component is based at least partially on the component temperatures of the available components, wherein the selected component has a lower temperature than other available components; and
   directing the selected component to perform the requested activity.

2. The method of claim 1, further comprising requesting the temperature from the available components.

3. The method of claim 1, wherein receiving the component temperatures includes receiving an indication of the component temperatures and determining the component temperatures based on the indication of the component temperatures.

4. The method of claim 1, wherein the components are processors.

5. The method of claim 1, wherein the components are memory modules.

6. The method of claim 1, wherein the components are hard drives.

7. The method of claim 1, further comprising:
   calculating an average component temperature of the available components;
   determining if the average temperature is above a threshold; and,
   in response to determining that the average temperature is above the threshold, delaying directing the selected component to perform the requested activity.

8. The method of claim 1, further comprising:
   calculating an average component temperature of the available components;
   determining if the average temperature is above a threshold; and
   in response to determining that the average temperature is above the threshold, directing the selected component to perform the activity at a reduced level of performance.

* * * * *